United States Patent [19]
Morrison et al.

[11] Patent Number: 5,321,578
[45] Date of Patent: Jun. 14, 1994

[54] RAIN DETECTOR FOR AUTOMATIC IRRIGATION SYSTEMS

[75] Inventors: Richard E. Morrison, Salt Lake City; Kent C. Ericksen, Centerville, both of Utah

[73] Assignee: Pro-Mark, Inc., Bountiful, Utah

[21] Appl. No.: 870,586

[22] Filed: Apr. 17, 1992

[51] Int. Cl.$^5$ .............................. A01G 25/16
[52] U.S. Cl. .............................. 361/178; 239/63
[58] Field of Search ............ 73/170.17, 170.21; 137/78.5, 78.4, 78.2; 340/602; 239/63; 361/178

[56] References Cited

U.S. PATENT DOCUMENTS

| Re. 31,204 | 4/1983 | Sanner | 137/78.3 |
|---|---|---|---|
| 3,212,714 | 10/1965 | Etal | 239/63 |
| 3,297,254 | 1/1967 | Coffman | 239/63 |
| 4,246,574 | 1/1981 | Sanner | 340/602 |
| 4,613,764 | 9/1986 | Lobato | 307/116 |
| 4,796,654 | 1/1989 | Simpson | 137/78.3 |

OTHER PUBLICATIONS

P. 55 showing Rain Check, 1991–1992 Rain Bird Turf Irrigation Equipment Catalog.

Primary Examiner—A. D. Pellinen
Assistant Examiner—Peter Ganjoo
Attorney, Agent, or Firm—Mallinckrodt & Mallinckrodt

[57] ABSTRACT

A rainfall detector for detecting a set amount of rainfall and which functions to interrupt the normal operation of an automatic sprinkler or irrigation system upon detection of the set amount of rainfall, includes a rain-water-collection tray having an opening and mounted so that the portion of the opening exposed to rainwater during a rainstorm is adjustable. The rainwater-collection tray may be slidably mounted below a detector housing which houses a switching circuit with two sensors extending into the tray, and which serves to block the rain from the open portion of the tray beneath the housing. Thus, the portion of the tray opening exposed to rain is adjusted by sliding the tray so that more or less of the opening is covered by the housing. The tray may also include posts extending upwardly from the bottom of the tray and terminating below the top edge of the tray for preventing debris from filling the rain-collecting portion of the tray.

13 Claims, 3 Drawing Sheets

RAIN DETECTOR FOR AUTOMATIC IRRIGATION SYSTEMS

BACKGROUND OF THE INVENTION

1. Field

The invention relates to rain detection systems for the control of automatic irrigation systems.

2. State of the Art

Automatic irrigation control systems are generally controlled primarily by a timing mechanism. There are systems which override the timing system when a certain quantity of rain is detected. This capability is desirable for both water conservation and to prevent damage to vegetation from over watering. Examples of such systems are disclosed in U.S. Pat. Nos. 4,613,764 and 3,297,254. Both of these patents describe systems wherein rainwater is collected in a collection tray. In each, two conductive sensors extend down into the collection tray to an adjustable depth from the bottom of the tray. An electronic switch is activated when the water level in the collection tray reaches the sensors, thereby electrically bridging the sensors.

In the prior art, the amount of rainfall which will interrupt the regular irrigation cycle is adjusted by adjusting the height of the sensors above the bottom of the rainwater-collection tray. The higher the bottom of the sensors are from the bottom of the tray, the more rainfall required to fill the tray to the level of the sensors. This method of adjustment limits the amount of rainfall which can be received without interrupting the irrigation cycle to approximately the depth of the rainwater-collection tray.

A further limitation of these systems is that debris which settles to the bottom of the rainwater collection tray reduces the effective depth of rain required to interrupt the regular cycle of the irrigation system. The amount of rainfall needed to interrupt the irrigation cycle will decline as debris builds up in the bottom of the rainwater-collection tray. Debris, such as wet leaves, can also make contact directly with the sensors and interrupt the regular irrigation cycle of the system. A method previously used to prevent this problem is to place a screen over the opening of the rainwater-collection tray. This method is disclosed, for example, in U.S. Pat. No. 3,212,714. This method has the disadvantage that the debris can build up on the screen and restrict the area of the opening of the tray. Thus, as debris builds up on the screen, less water from a given amount of rain will collect in the tray. In such instance, the amount of rainfall necessary to interrupt the irrigation cycle will increase as debris builds up on the screen.

SUMMARY OF THE INVENTION

According to the invention, a rainfall detector can provide adjustment over a wide range of rainfalls, by providing an open-topped rain-water-collection tray with means for adjusting the portion of the open top, i.e., the horizontal area of the open top, exposed to rain. The larger the opening exposed to rain for a given size of tray, the faster a given amount of rain will fill the tray to a level to activate the detector. The tray is preferably slidably mounted beneath a detector housing so that the tray can be moved from under the housing to expose more of the tray's top opening to the rain or moved further under the housing to block more of the tray's top opening. Rain is blocked from the portion of the tray's opening under the housing. As in the prior art, the rainfall detector is placed electrically in series between an irrigation system controller and electrically actuated sprinkler valves so that, when a selected amount of rainfall is detected, the normal watering or irrigation cycle is interrupted. During periods of rain, rain is collected in the rainwater-collection tray through the portion of the tray's top opening exposed to the rain. A pair of conductive sensors extend down into this tray a fixed distance above the bottom of the tray. When the level of rainwater in the tray reaches the pair of sensors, the water acts as an electrical connection between the sensors. The electrical connection of the pair of sensors causes the electronics of the rainfall sensor to electrically isolate the irrigation controller from the sprinkler valves. The normal cycle of the irrigation system is thereby interrupted by the rainfall to prevent overwatering and to conserve water. The electronic switching circuit is enclosed in a plastic housing to protect it from the environment.

The amount of rainfall, $d_R$, which will interrupt the regular cycle of the irrigation system is $$d_R = \frac{A_T}{A_o} d$$

where $A_T$ is the average horizontal cross sectional area of the rainwater collection tray from the bottom of the tray to the sensors, $A_O$ is the horizontal area of the exposed opening of the rainwater-collection tray, and d is the distance from the sensors to the bottom of the rainwater-collection tray. The applicant discovered that the amount of rainfall $d_R$ which will interrupt the regular irrigation cycle can be adjusted by varying $A_O$ instead of d to provide a much greater range in the selectable amount of rainfall $d_R$.

The amount of rainfall required to interrupt the regular cycle of the irrigation system is adjusted, according to the invention, by partially closing the opening of the rainwater-collection tray. The smaller the opening remaining above the rainwater-collection tray, the greater the rainfall required to interrupt the regular cycle of the irrigation system. In the preferred embodiment of the invention here illustrated and described in detail, the rainwater-collection tray is slidably suspended below the housing for the detector. The detector housing is thereby used to adjustably cover a portion of the opening of the rainwater-collection tray.

According to the invention, means is also provided for preventing debris from settling to the bottom of the rainwater-collection tray. In the preferred embodiment, a plurality of posts protrude from the bottom of the rainwater-collection tray up to a level above the sensors but below the top edge of the rainwater-collection tray. This has the advantage of preventing most debris from settling into the rainwater-collection tray, but does not restrict the opening of the tray to rainfall because debris is held below the top rim of the tray. These posts also prevent debris which enters the front of the rainwater-collection tray from migrating back to the sensors. The sensors generally extend into the tray in a portion thereof covered by the detector housing. This prevents the debris from bridging the sensors.

A mounting bracket is rotatably mounted to the housing of the rain detector so that the attitude of the rain detector can be adjusted after mounting. This adjustable mounting bracket also allows the rain detector to be mounted on surfaces of various orientations. For example, the rain detector can be mounted on a vertical surface such as a wall, a horizontal surface such as a floor, top of a post, or flat roof, or on an inclined surface such as a roof. This is accomplished with a simple hinge structure which is economical to manufacture and easy to adjust.

THE DRAWINGS

The best mode presently contemplated for carrying out the invention is illustrated in the accompanying drawings, in which:

FIG. 1 is a block diagram of an automatic irrigation system with the rain detector in place;

FIG. 2, a perspective view of the rain detector as mounted on a vertical surface;

FIG. 3, a top plan view of the rain detector;

FIG. 4, a rear elevation of the rain detector;

FIG. 5, a front elevation of the rain detector;

FIG. 6, a bottom plan view of the rain detector; and

FIG. 7, a side elevation of the rain detector showing various orientations of the rainwater-collection tray and mounting bracket.

DETAILED DESCRIPTION OF THE ILLUSTRATED EMBODIMENT

Figure 1:
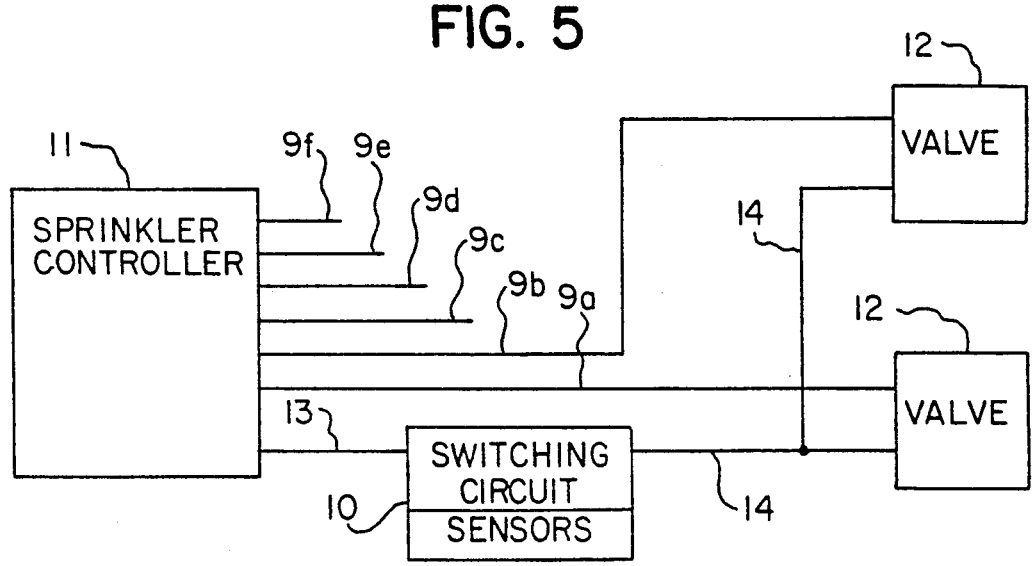

It is desirable to interrupt the normal irrigation cycle of an automatic irrigation system during rainy periods for both water conservation and to prevent damage to vegetation. To accomplish this, a rain detector 10, FIG. 1, with electronic switching means is electrically interposed in series between a sprinkler controller 11 of a conventional automatic irrigation system and the electrically actuated sprinkler valves indicated by the two blocks 12 of the system. While two blocks 12 representing valves are shown for ease of illustration, any number of valves operable by the controller may be used. Many commercially available controllers operate up to six separate valves connected electrically in parallel by separate control wires 9a, 9b, 9c, 9d, 9e and 9f as shown in FIG. 1. In this way, each valve is independently controlled by controller 11. The electronic switching means of the rain detector 10 may be conveniently electrically connected in the common return line of the conventional irrigation controller 11 indicated by wire 13 between the controller and detector, and wires 14 between the detector and the electrically actuated sprinkler valves 12 so as to electrically connect wires 13 and 14 for normal operation of the system, or disconnect such wires when normal operation is to be interrupted due to detection of rain. Alternately, the electronic switching means of detector 10 could be connected to a relay or other switch connecting wires 13 and 14 to cause the electrical connection and disconnection.

Figure 2:
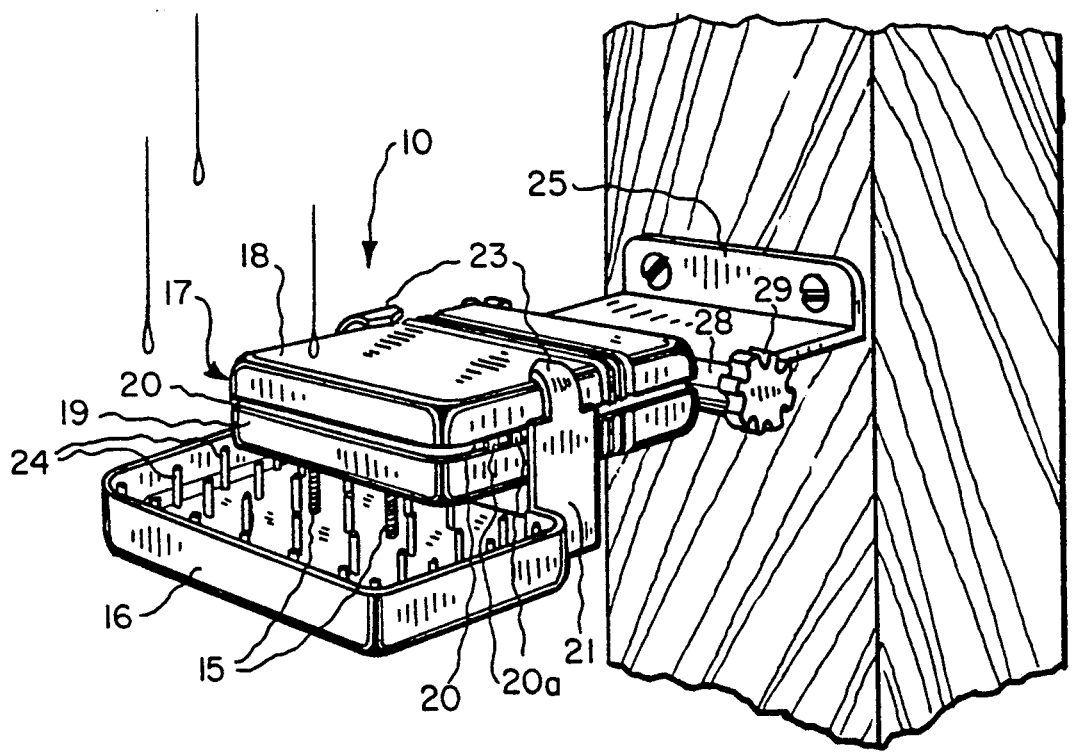
Figure 3:
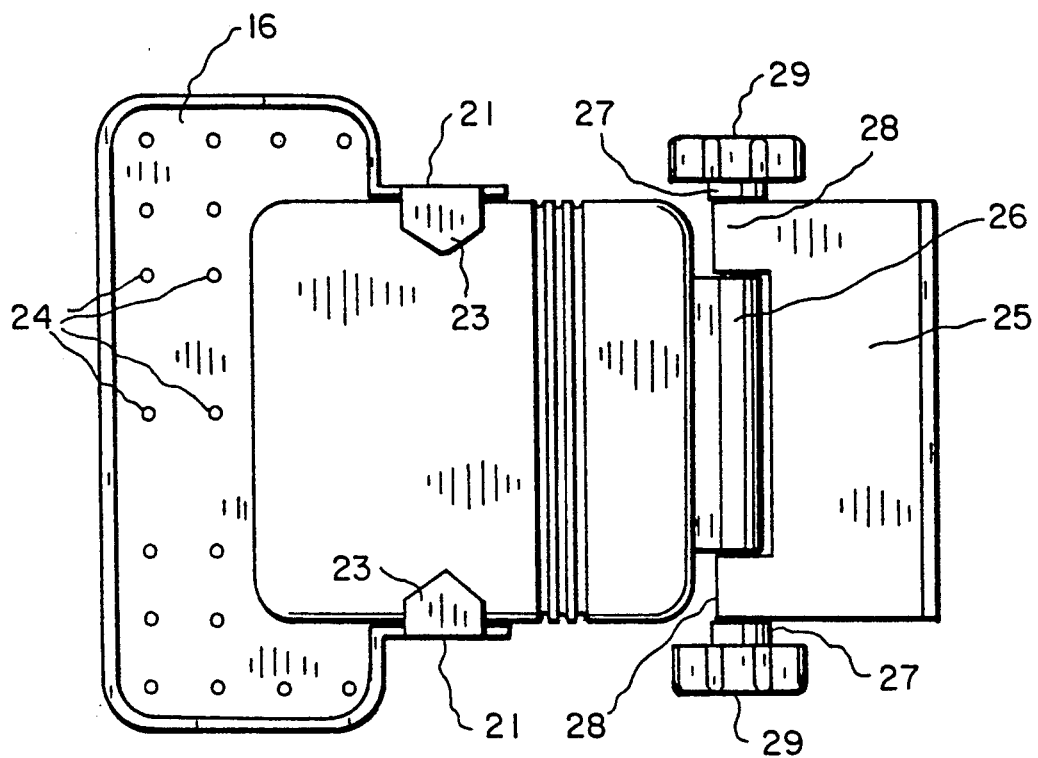
Figure 7:
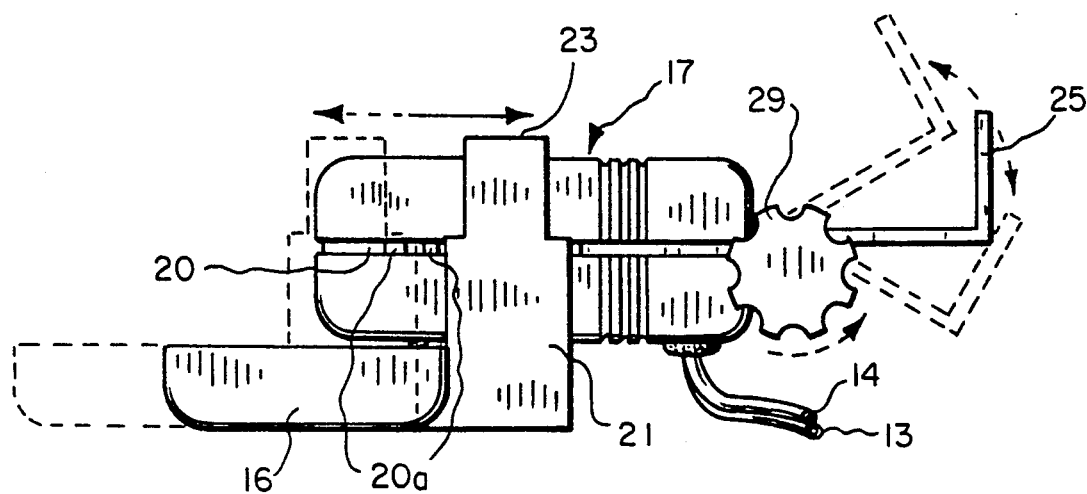
Figure 6:
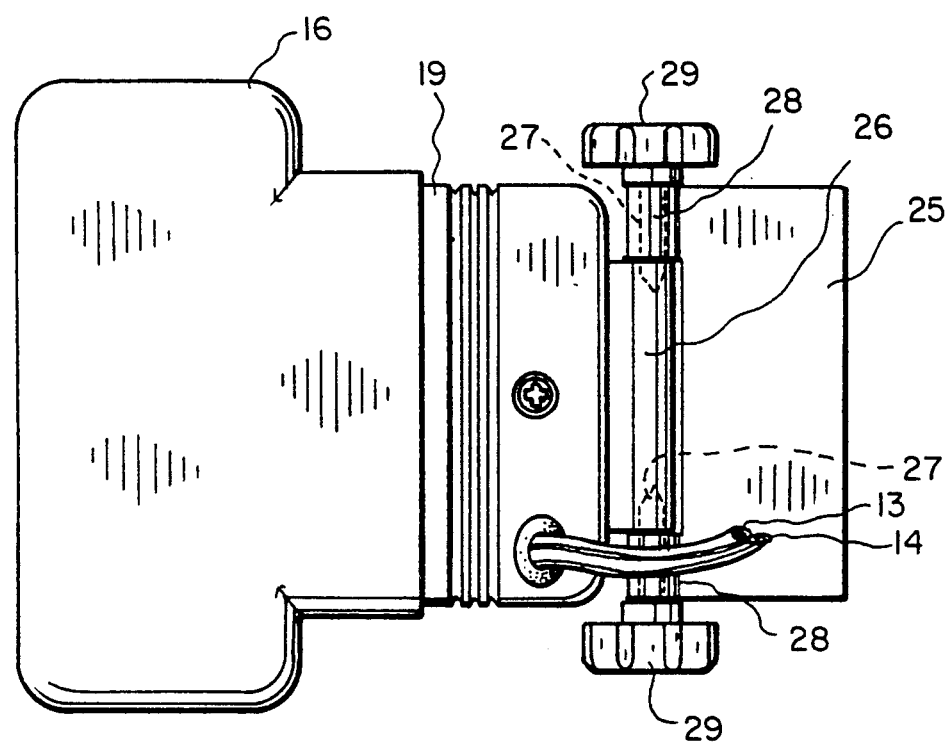

Rain is collected in a rainwater-collection tray 16, FIGS. 2, 3, and 7, having an open top. A pair of conductive sensors 15 extend down into the rainwater collection tray 16 a fixed distance away from the bottom of the tray 16. The conductive sensors 15 form part of the electronic switching means and sense the presence of rainwater bridging the sensors 15. In the normal mode of operation, when the pair of sensors 15 form an open circuit (i.e., no water is bridging the sensors), the electronic switching means acts as a closed switch thereby connecting the controller 11 to the sprinkler valves 12. The sprinkler valves operate in normal manner under control of the controller. When the level of rainwater in the tray 16 reaches the pair of sensors 15, the water acts as an electrical connection between the two sensors 15. When this occurs, the electronic switching means acts as an open switch electrically disconnecting the controller 11 from the sprinkler valves 12 thereby interrupting the regular irrigation cycle. The electronic switching means itself may be of various standard types which are well-known in the art so will not be described in detail here. An example of circuitry usable as the electronic switching means is disclosed in U.S. Pat. No. 4,613,764 and that disclosure is incorporated herein by reference.

Figure 4:
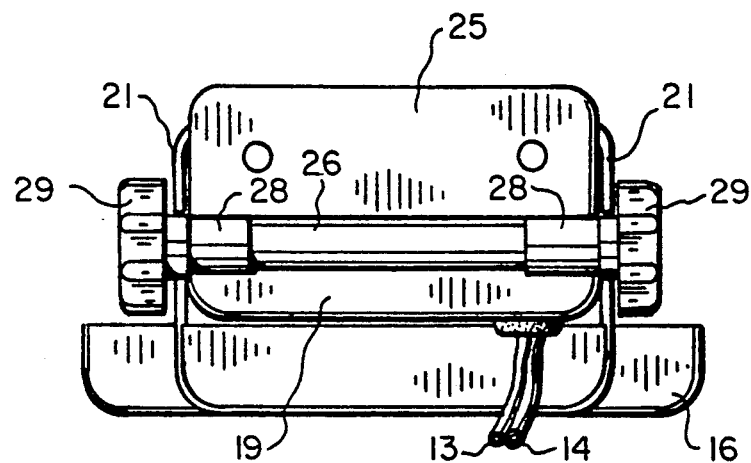
Figure 5:
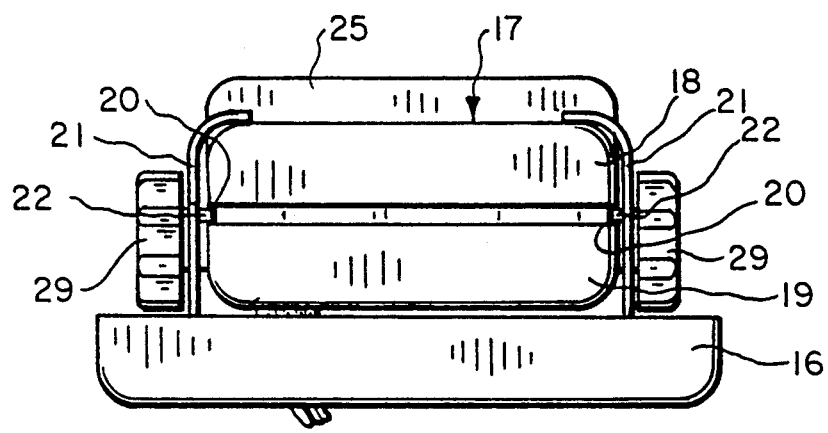

The electronic switching means is enclosed in a plastic detector housing, indicated generally as 17, to protect it from the environment. The detector housing 17 is advantageously formed by joining a top housing half 18 and a bottom housing half 19, FIGS. 2, 5 and 7, molded from plastic. A groove track 20 is formed opposite sides of the detector housing 17 at the junction between these two halves.

The rainwater-collection tray 16 is suspended below the detector housing 17 by two lateral arms 21 formed from resilient plastic as an integral part of the tray 16. Each of the resilient arms 21 has a tongue 22, FIG. 5, formed thereon for engaging the groove track 20 of the detector housing 17. This arrangement allows the rainwater-collection tray 16 to be moved to a selected position along the groove track 20 so that the detector housing covers a selected portion of the opening of the rainwater-collection tray 16. The solid lines in FIG. 7 show tray 16 in an intermediate position under detector housing 17 while the broken lines show the tray 16 moved to the left in FIG. 7 to a more uncovered position. In this more uncovered position, more of the tray opening is exposed to the rain and the tray will fill with rain more rapidly. With this arrangement, rainwater-collection tray 16 can be moved along track 20 over a wide range of adjustments to the size of the opening, or the horizontal area of the opening, that is uncovered and thus exposed to the rain for rainwater-collection purposes. Further, track 20 may be provided with small projection 20a, FIGS. 2 and 7, therein which cooperate with tongues 22 to serve as adjustment stops to provide adjustment steps for the tray as it slides along the track. This also holds the adjustment of the tray once set.

The resilient arms 21 continue past the tongue 22 and extend to the top of the detector housing 17, FIG. 3, and terminate pointers 23. Pointers 23 provide a visual indication of the amount of rainfall necessary to interrupt the regular irrigation cycle. If desired, a scale to indicate rainfall necessary to activate the detector may be printed on the top of detector housing 17 adjacent pointers 23, or an indication of the direction of movement or the extremes of movement for faster or slower system shut-off can be indicated.

A plurality of posts 24, FIGS. 2 and 3, are molded into the bottom of the rainwater-collection tray 16, extending from the bottom of the collection tray 16 to a height above the lower ends of sensors 15 and below the top edge of the collection tray 16. These posts 24 prevent debris of larger are, such as leaves from settling to the bottom of the rainwater-collection tray 16 and also prevent items of debris larger than the spacings between mutually adjacent posts 24 from migrating toward the two sensors 15.

A mounting bracket 25, FIGS. 2 and 3, 6, and 7 is rotatably mounted to a detector housing bracket 26 molded into the back of the rain detector housing 17 by two screws 27 which pass through collars 28 on the mounting bracket 25 and engage threaded holes in the detector housing bracket 26 of the detector housing 17. The two screws 27 have enlarged knobs 29 enclosing the heads of the two screws 27 so that they can be easily tightened by hand to thereby lock the position of the rain detector 10 with respect to the mounting bracket 25. The attitude of the rain detector 10 can be adjusted by loosening the screws 27 by hand, rotating the detector 10 to the desired position, and tightening the screws 27 to lock the detector 10 back into position. With this adjustment, the detector of the invention can easily be mounted on vertical, horizontal, or sloped surfaces and adjusted so that rainwater-collection tray 16 is in a horizontal position, or in a desired sloped position.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A rain detector for interrupting the regular cycle of an automatic irrigation system having a controller and at least one electrically actuated sprinkler valve, comprising:
    a detector housing;
    a rainwater collection tray having an open top area adapted to be exposed to rain for the collection of rainfall and disposed partially below said housing;
    a pair of conductive sensors protruding from said housing into said rainwater collection tray;
    a switching circuit means disposed within said housing for providing electrical connection between the controller and the sprinkler valve when said pair of sensors form an open circuit and electrical disconnection between the controller and the sprinkler valve when the level of rainwater within said rainwater collection tray bridges said pair of sensors;
    means for varying said open top area exposed to rain of said rainwater collection tray; and
    a plurality of upstanding posts rising from the bottom of said rainwater collection tray to prevent leaves and similar large area debris from settling to the bottom of said rainwater collection tray.

2. The rain detector of claim 1 wherein said posts extend from the bottom of said rainwater collection tray to a height above the depth of said pair of sensors and below the top of said rainwater collection tray.

3. The rain detector of claim 1 further comprising a mounting bracket rotationally mounted on said detector housing by screws extending through openings in said mounting bracket and engaging threaded openings in said detector housing.

4. The rain detector of claim 3 wherein said screws terminate in knobs at the head so that said screws can be tightened and loosened by hand.

5. A rain detector for interrupting the regular cycles of an automatic irrigation system having a controller and at least one electrically actuated sprinkler valve, comprising:
    a detector housing;
    a rainwater collection tray having an open top area adapted to be exposed to rain for the collection of rainfall and disposed partially below said housing;
    a pair of conductive sensors protruding from said housing into said rainwater collection tray;
    a switching circuit means disposed within said housing for providing electrical connection between the controller and the sprinkler valve when said pair of sensors form an open circuit and electrical disconnection between the controller and the sprinkler valve when the level of rainwater within said rainwater collection tray bridges said pair of sensors; and
    means for slidably mounting the rainwater collection tray below the detector housing whereby the rainwater collection tray can be adjustably moved in relation to the detector housing to thereby expose more or less of the opening of the collection tray to rain.

6. The rain detector of claim 5, wherein an adjustable portion of the open top of the collection tray is positioned below the detector housing and the detector housing blocks the portion of the opening thereunder from rain.

7. A rain detector for interrupting the regular cycle of an automatic irrigation system, having a controller and at least one electrically actuated sprinkler valve, comprising:
    a detector housing with a groove track on each of two opposing sides of said housing;
    a rainwater collection tray with an upward opening for the collection of rain suspended slidably from said groove track below said housing so that said housing covers an adjustable portion of said opening of said rainwater collection tray;
    a pair of conductive sensors protruding from said housing into said rainwater collection tray; and
    a switching circuit means disposed within said housing for causing electrical connection between the controller and the sprinkler valve when said pair of sensors form an open circuit and electrically disconnecting the controller from the sprinkler valve when the level of rainwater within said rainwater collection tray bridges said pair of sensors.

8. The rain detector as in claim 7 wherein said rainwater collection tray includes two flexible arms extending upward laterally from said rainwater collection tray with a tongue on each arm for engaging said groove track in said detector housing.

9. The rain detector of claim 8 wherein said rainwater collection tray and said two flexible arms are molded as a single piece of flexible plastic.

10. The rain detector of claim 8 wherein said two arms extend to the top of said detector housing for providing a visual indicator of the level of rainfall selected to interrupt the regular cycle of the irrigation system.

11. The rain detector of claim 7 wherein said detector housing comprises a top half and a bottom half joined together so that the junction between said top half and said bottom half form said groove track in said detector housing.

12. A rain detector for interrupting the regular cycle of an automatic irrigation system having a controller and at least one electrically actuated sprinkler valve, comprising a rainwater collection tray having an open top area adapted to be exposed to rain for collection of rainwater from the rain that falls into said open top area thereof; rain blocking means constructed to cover a desired portion of said open top area of said collection tray to prevent rainfall from entering the so-covered portion thereof; means for slidably supporting said collection tray below said rain blocking means so that it can be slidably adjusted back and forth thereunder to expose a desired portion of said open top to rainfall.

13. A rain detector for interrupting the regular cycle of an automatic irrigation system having a controller and at least one electrically actuated sprinkler valve, comprising a rainwater collection tray having an open top area adapted to be exposed to rain for collection of rainwater from the rain that falls into said open top area thereof; rain blocking means constructed to cover a desired portion of said open top area of said collection tray to prevent rainfall from entering the so-covered portion thereof; and slideway supporting means arranged relative to said tray and said blocking means so that one slides relative to the other.

* * * * *